US007805851B2

(12) United States Patent
Pettersson

(10) Patent No.: US 7,805,851 B2
(45) Date of Patent: Oct. 5, 2010

(54) ARTICULATED ARM COORDINATE MEASURING MACHINE

(75) Inventor: Bo Pettersson, London (GB)

(73) Assignee: Leica Geosystems AG, Heerbrugg (CH)

( * ) Notice: Subject to any disclaimer, the term of this patent is extended or adjusted under 35 U.S.C. 154(b) by 14 days.

(21) Appl. No.: 12/417,146

(22) Filed: Apr. 2, 2009

(65) Prior Publication Data

US 2009/0249634 A1 Oct. 8, 2009

(30) Foreign Application Priority Data

Apr. 7, 2008 (EP) .................................. 08103411

(51) Int. Cl.
*G01B 7/008* (2006.01)
*G01B 5/008* (2006.01)
(52) U.S. Cl. ........................................................ 33/503
(58) Field of Classification Search ................. 33/503
See application file for complete search history.

(56) References Cited

U.S. PATENT DOCUMENTS

| 3,774,311 | A | * | 11/1973 | Stemple | 33/503 |
| 4,305,207 | A | * | 12/1981 | Lantz | 33/503 |
| 4,892,407 | A | * | 1/1990 | McMurtry et al. | 356/622 |
| 5,068,971 | A | * | 12/1991 | Simon | 33/503 |
| 5,402,582 | A | | 4/1995 | Raab | |
| 5,768,792 | A | * | 6/1998 | Raab | 33/503 |
| 5,957,837 | A | * | 9/1999 | Raab | 600/300 |
| 5,978,748 | A | * | 11/1999 | Raab | 702/150 |
| 7,051,450 | B2 | | 5/2006 | Raab et al. | |
| 7,165,335 | B2 | * | 1/2007 | McMurtry | 33/503 |
| 7,296,363 | B2 | * | 11/2007 | Danisch et al. | 33/556 |
| 7,578,069 | B2 | * | 8/2009 | Eaton | 33/503 |
| 7,640,674 | B2 | * | 1/2010 | Ferrari et al. | 33/502 |
| 2003/0066202 | A1 | * | 4/2003 | Eaton | 33/503 |
| 2005/0166413 | A1 | * | 8/2005 | Crampton | 33/503 |

FOREIGN PATENT DOCUMENTS

EP 1474650 A2 11/2004

* cited by examiner

*Primary Examiner*—Christopher W Fulton
(74) *Attorney, Agent, or Firm*—Workman Nydegger

(57) ABSTRACT

The invention relates to a coordinate measuring machine (CMM) for determining a measuring position of a probe. The CMM comprises an articulated arm having first and second ends and at least one joint between the first and the second end, the first end forming a base being positionable on a supporting surface, the second end being movable relative to the first end and having attached the probe. Further exists at least one sensing unit for measurement of an actual relative setting of said at least one joint and at least one computing unit for calculating a measuring position of the probe relative to the base, as well as for referencing the measuring position in an external coordinate system by using a provided base-position in the external coordinate system.

16 Claims, 5 Drawing Sheets

ARTICULATED ARM COORDINATE MEASURING MACHINE

BACKGROUND

The present invention relates generally to a coordinate measuring machine (CMM) for determining a measuring position of a probe and a method for determining a measuring position of a probe of a coordinate measuring machine (CMM).

There is a demand for high precision position measurement of object surface points in many technical fields. In particular for the manufacturing industry the measurement and quality control of produced objects have high significance.

In connection with these fields there exist a number of measuring devices which are formed for such special tasks, usually being called coordinate measuring machines (CMM). One type of such devices is an articulated arm CMM, with some embodiments of such articulated arm CMMs being exemplarily described in U.S. Pat. Nos. 5,402,582, 7,051,450 and EP 1 474 650. Comparable systems are offered, for example, by the firm "ROMER" as "SIGMA", "FLEX" or "OMEGA" and by the firm "CIMCORE" as "INFINITE" or "STINGER".

A conventional three-dimensional articulated arm CMM is composed of a manually operated multi-jointed articulated arm having a support base on one end and a measurement probe at the other end thereof. A host computer may communicate with the arm via an intermediate controller or serial box.

Articulated arm CMMs are usually formed in such a way that the measurement probe is freely movable in a specified volume. Thereby, a counterbalance system may be provided so that a user can move the arm easily and with small forces. One possibility of providing a counterbalance is to install counter-weights on the arm components. Another possibility is to use spring forces or gas cylinders to provide the counterbalance.

Each joint of the articulated arm is assigned at least one sensing unit for measurement of an actual relative setting of the respective joint. Therefore, for example, optoelectronic angle sensors are used.

By combining the measured relative settings of each joint of the arm the exact three-dimensional position of a surface point of interest, e.g. which is touched by the measurement probe, can be derived relative to the base. Thus, the coordinates of this surface point can be calculated in a machine-internal coordinate system.

In many applications, however, the exact position of the surface point is needed relative to an external coordinate system, for example in a defined measurement room or working area. Therefore, a couple of methods are known for referencing or matching the determined machine-internal coordinates of the measuring points relative to the external coordinate system, in particular in connection with portable or moveable articulated arm CMMs.

For example, once the external position of the base is known—assuming that the base of the arm is placed horizontally—the measured internal positions can be transferred into the external coordinate system and, thus, referenced in the measurement room or working area.

In this context, the internal position of a point shall be understood as the position of said point given in the machine-internal coordinate system and, therefore, relative to the base of the CMM. Accordingly, the external position of a point means the position of the point in the external coordinate system, thus making it possible to specify a position of interest in a defined external measurement room or working area.

In order to provide the possibility of referencing internal positions relative to an external measurement room, reference points may be installed on the floor of the measurement room, the exact positions of the reference points being known in the external coordinate system. Preferably, the reference points are positioned in a net-forming manner so that at least three defined reference points can be reached by the probe of the articulated arm CMM wherever the base of the CMM is positioned in the measurement room. Hence, by measuring at least three reference points by the articulated arm CMM, the external position of the base can be recalculated and, thereafter, any measured internal position of surface points of interest can be referenced in the external coordinate system.

The base of the CMM is built for being positionable on a supporting surface, for example the floor of a measuring room or a table. Therefore, the base usually is built very stably and rigid. Exemplarily, the base can comprise a planar bottom side in order to put the CMM rigidly on the supporting surface. Alternatively, stands, in particular trolley stands, are used as part of the base for placing the articulated arm CMM on a desired position on the floor.

Thereby, the base can be understood as that part of the articulated arm CMM which is not moved while operating the articulated arm during a measurement, e.g. while directing the probe of the arm towards the point to be measured.

According to articulated arm CMMs of the state of the art, it is assumed that the base has a completely rigid stand on the supporting surface and that the position and the slope of the base don't vary during measurements. Therefore, using a determined or given external position of one known point of the base would be feasible for referencing measured internal positions of points of interest relative to the external coordinate system.

However, it has turned out that varying load conditions of the supporting surface—whereupon the base is placed—influence the precision and accuracy of the determined external positions of measured points of interest.

Furthermore, a torque or a force which acts not perpendicular to the supporting surface onto the base of the articulated arm during measurements may introduce an error in case that the support and/or the base are not rigid enough. This may happen if the counterbalance system of the arm uses spring forces for providing a balanced arm, as such a counterbalance system may introduce varying and not straight down acting forces onto the base while operating and moving the probe of the arm.

It is therefore an object of the present invention to provide an improved articulated arm CMM, in particular wherein the above mentioned disadvantages of machines of the art are reduced or eliminated. A further object is to allow a more precise and less troublesome referencing of a measured point of interest relative to an external coordinate system, particularly in case of varying load conditions of the supporting surface whereupon the base is placed.

Those objects are achieved by realising the features of the independent claims. Features which further develop the invention in an alternative or advantageous manner are described in the dependent patent claims.

SUMMARY

The inventive concept separates from the assumption that the once determined or given relation between a machine-internal coordinate system and an external coordinate system remains constant during measurements until the articulated arm CMM is moved to another measurement place. Contrary thereto, according to the inventive concept a further measurement parameter is introduced that indicates an actual relation between the internal and external coordinate system.

According to the invention, this is realized by installing at least a first inclinometer on one part of the articulated arm to measure a slope of that part of the arm relative to an external vector which is referenced in the external coordinate system. This further relation of the articulated arm relative to the external coordinate system is used—besides e.g. an available or determined external position of the base of the arm—for referencing the measured internal positions of points of interest relative to the external coordinate system.

Particularly the slope is measured relative to the gravitational vector, so that a slope of the articulated arm CMM relative to a horizontal plane can be determined. Thus, a varying slope of the machine—respectively a varying slope of the supporting surface—can be taken into consideration for calculating the external position of a point of interest.

Generally, the articulated arm CMM is formed for determining a measuring position of a probe. As known according to the state of the art, the CMM comprises an articulated arm having first and second ends and at least one joint between the first and the second end, the first end forming a base being positionable on a supporting surface, the second end being movable relative to the first end and having attached the probe.

In connection with the at least one joint, at least one sensing unit for measurement of an actual relative setting of said at least one joint is provided.

Furthermore, the articulated arm CMM comprises at least one computing unit for calculating a measuring position of the probe relative to the base using the measured actual relative setting of the at least one joint. Furthermore, the computing unit is formed for referencing the measuring position in an external coordinate system by using a provided or previously determined external base-position.

As mentioned above, according to the invention, the articulated arm further comprises a first inclinometer for measurement of a slope relative to an external vector referenced in the external coordinate system, particularly relative to the gravitational vector. Connected to the measured slope, the first inclinometer provides an electronic slope value, this slope value being used—besides the provided or previously determined external base-position—for referencing the measuring position in the external coordinate system.

Hence, the slope of the measuring machine and—as the base of the CMM is placed on a supporting surface, i.e. the floor—also the slope of the supporting surface can be monitored and—by using the measured slope value for referencing the machine-internal coordinate system relative to the external working area—a compensation for different slopes is provided.

Particularly the first inclinometer can be mounted on or integrated into the base of the articulated arm. Then the measured slope relative to the external vector can directly be used to also indicate the slope of the supporting surface, i.e. the floor, whereupon the base is placed.

Alternatively, the inclinometer can be mounted onto or be integrated into any other component or part of the arm. As the exact setting of each joint is measured in connection with each position measurement, the cubical position of the arm is determined in the machine-internal system, which means relative to the base. Thus, the measured external slope of one part of the arm relative to a horizontal plane can be transferred to an external slope value of the base and therefore be used for deriving a relationship between the internal and the external coordinate system.

Inclinometers—which are designed for measuring a slope relative to a gravitational vector and for providing an electronic slope value—are known per se in the state of the art. For example accelerometers, liquid capacitive tilt sensors, electrolytic tilt sensors or optoelectronic tilt sensors are known as such inclinometers. The choice and the concrete design of the first inclinometer can be configured by a skilled person according to given requirements. As already minimal variations of the slope of the supporting surface and/or the base may cause a high error of measurement, particularly in connection with comparatively big articulated arms, it is advantageous to use highly sensitive and highly accurate inclinometers. The measurement range or tilt angle range may be chosen relatively small, e.g. around $\pm 0.01°$ to $\pm 10°$ relative to the external reference vector, as the expectable variations of the slope of the floor and/or the base are usually very low.

For example, the first inclinometer can be built as a one- or two-axis optoelectronic inclinometer. Such optoelectronic inclinometers may comprise a bubble tube, a light emitting element for emitting detection light and a photodetector element. The detection light is used for generating an image onto the photodetector element, the image being dependent on the position of the bubble. By reading out the photodetector an electronic slope value in one or two axes can be derived and issued.

Advantageously, the first inclinometer is formed as a two-axis inclinometer, so that slope values in two directions relative to the horizontal plane can be measured.

Methods for deriving a relationship between the machine-internal coordinate system and the external coordinate system are known per se. Once the external position of one defined point of the base and an orientation of the base are known, coordinate transformation parameters for referencing points of the internal coordinate system relative to the external coordinate system can be derived in known manners.

Whereas—according to the state of the art—the orientation of the base is assumed as being perpendicular to the supporting surface and further that the slope of the supporting surface doesn't vary, contrary thereto—according to the invention—the actual orientation of the base relative to an external horizontal plane is measured and used for deriving the exact actual relationship between the internal and the external coordinate system. Thereby, the measurement of the slope relative to the external vector or horizontal plane is performed non-interacting to the measurement of the internal probe-position relative to the base.

According to a further embodiment, at least a second inclinometer is arranged on the articulated arm, particularly on the base. Especially, if the first inclinometer is formed as one-axis tilt sensor, the addition of one or more further inclinometers can be advantageous for measuring the exact orientation of the base relative to a horizontal plane. Hence, all measured slope values relative to the external vector by the first, second or further inclinometers can be used for referencing internal measuring positions relative to the external coordinate system.

In a further embodiment, in connection with each position measurement—which means in connection with each determination of an external position of a point measured by the probe—an actual slope value is measured and submitted to the computing unit by said first inclinometer. The computing unit then uses the received actual slope value for referencing the internal measuring position in the external coordinate system. Thus, every variation of a slope of the supporting surface and/or the base may be considered for the measurements.

Furthermore, the actual slope value may be measured and provided continuously, particularly with a given measurement rate, by said first inclinometer. For example the slope value can be measured and determined with a rate of 1 to 100 Hz and, for each measurement, the actual slope value can be used for deriving the external position of interest.

The invention further relates to a method for determining a measuring position of the probe of the articulated arm CMM. The method comprises the steps of measuring an actual relative setting of the at least one joint—respectively all joints—of the articulated arm, calculating a measuring position of the probe relative to the base by combining the measured relative settings of each joint, and referencing the measuring position in an external coordinate system by using a provided base-position in the external coordinate system.

According to the invention the steps of measuring a slope of at least one part of the articulated arm relative to an external vector referenced in the external coordinate system, particularly relative to the gravitational vector, and providing a slope value is further performed. Hence, for referencing the measuring position in the external system, not only the given or determined external base-position is used, but also the external slope value.

Especially the slope of the base or of the supporting surface is measured relative to a horizontal plane.

Thereby, the slope may be measured continuously, particularly with a given measurement rate, and/or in connection with each position measurement and then used for referencing the measuring position in the external coordinate system.

According to a special embodiment, the base-position is provided by measuring internal positions of at least three reference points relative to the base using the articulated arm of the coordinate measuring machine, the positions of the reference points being known in the external coordinate system. Once the positions of the reference points relative to the base have been measured, a relation between the internal and the external system can be derived by known mathematical methods and the internal base-position can be transferred into the external coordinate system.

Therefore, reference points may be provided on the floor of a measuring room in a grade-forming way, the positions of the reference points being known with high accuracy. Thus, if points to be measured are out of reach of the articulated arm, the articulated arm CMM can be moved and referenced relative to the room again by measuring known reference points.

According to the invention, even if the slope of the floor varies and, thus, also the cubical orientation of the articulated arm CMM in the measuring room varies, the points to be measured of an object surface can be referenced with improved accuracy compared with CMMs of the state of the art. For example, such variations of the floor of the measuring room may be caused by changing load conditions on the floor, particularly affected through a measuring person or a heavy object to be measured—like a car.

BRIEF DESCRIPTION OF THE DRAWINGS

The invention will be explained in greater detail below with reference to examples of possible embodiments shown schematically in the drawings, in which.

DETAILED DESCRIPTION

The principles of the embodiments described herein show the structure and operation of several examples used to illustrate the present invention. It should be understood that the drawings are diagrammatic and schematic representations of such example embodiments and, accordingly, are not limiting the scope of the present invention, nor are the drawings necessarily drawn to scale.

Figure 1:
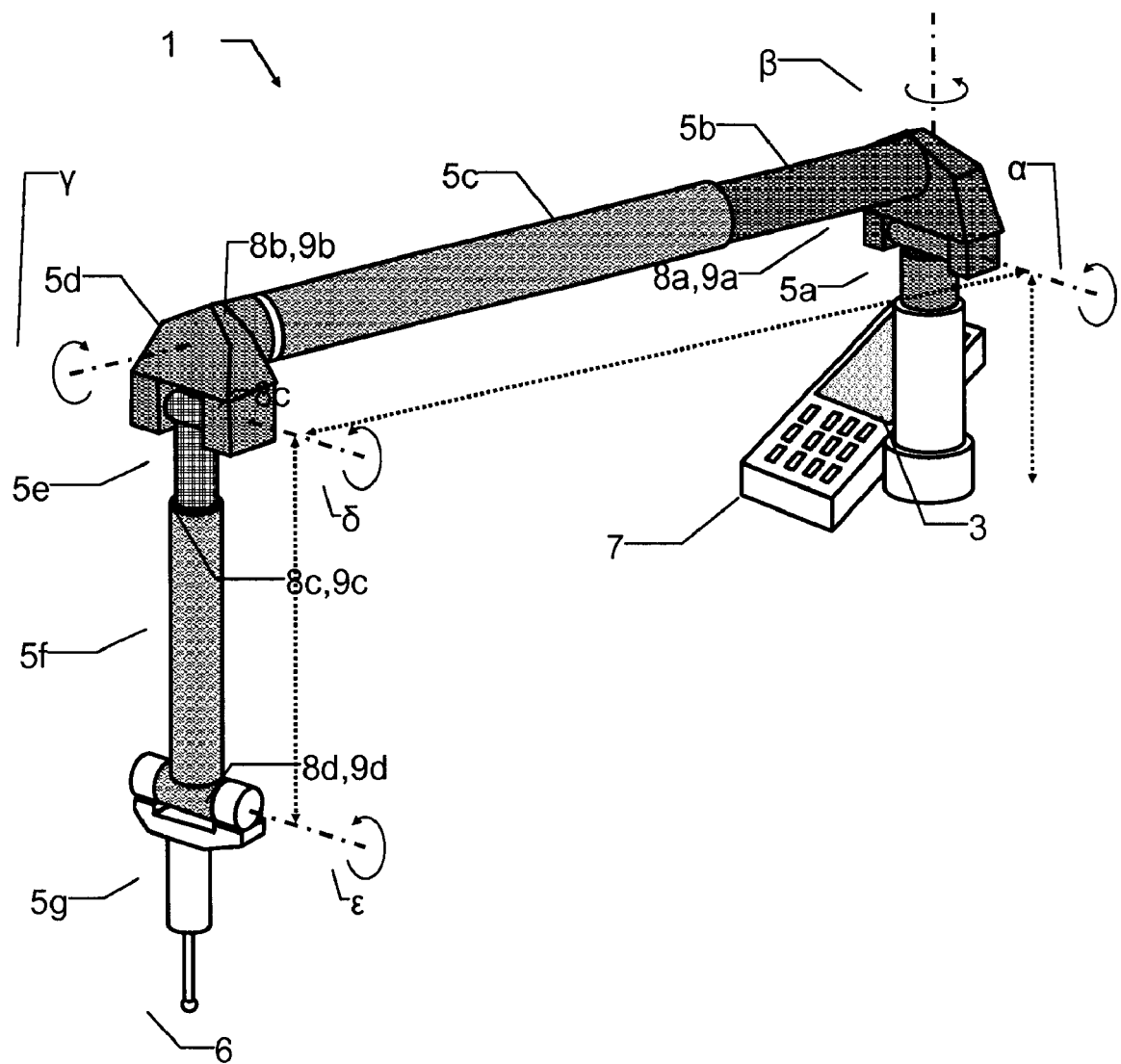
FIG. 1 shows an articulated arm CMM according to the state of the art.

FIG. 1 shows an articulated arm CMM 1 according to the state of the art. The CMM is designed for determining a measuring position of the probe 6. Therefore, the articulated arm CMM 1 comprises a base 3 which forms the support of the CMM and which can be positioned onto a surface, particularly a floor or a table. Connected to the base 3 several arm-components 5a-5g are linked by joints 8a-8d, thus, the arm-components 5a-5g being movable relative against each other.

A first arm-component 5a is linked with and movable relative to the base 3, a second arm-component 5b is linked with and movable relative to the first arm-component 5a, and so on. The last arm-component 5g—which forms the end of the articulated arm—has attached a probe 6, thus, the probe 6 being freely movable within a given volume. For example, the probe 6 is manually operable by a user and may be designed as a ruby ball in order to be build for contacting a surface point to be measured.

For clarity reasons, the different arm-components 5a-5g are illustrated with different hatchings.

Furthermore, at least one sensing unit 9a-9d is allocated to each joint 8a-8d, the sensing units 9a-9d being formed for measurement of an actual relative setting of each of the joints 8a-8d. Thereby, the sensing units 9a-9d are, for example, installed in the housings of the corresponding joints 8a-8d and, thus, not explicitly shown in the drawings. For example, optoelectronic angle sensors are used as the sensing units to measure an actual angle $\alpha$, $\beta$, $\gamma$, $\delta$, $\epsilon$ between two arm-components linked by the corresponding joint.

The measured actual setting of each joint 8a-8d is transmitted to a computing unit 7. By combining the relative settings of each joint 8a-8d, the computing unit 7 calculates the internal position of the probe 6—respectively the position of the point being touched by the probe 6—relative to the base 3 of the coordinate measuring machine 1. For example, the coordinates of the calculated internal position relative to the base 3 may be displayed on a display of the computing unit 7.

Figure 2:
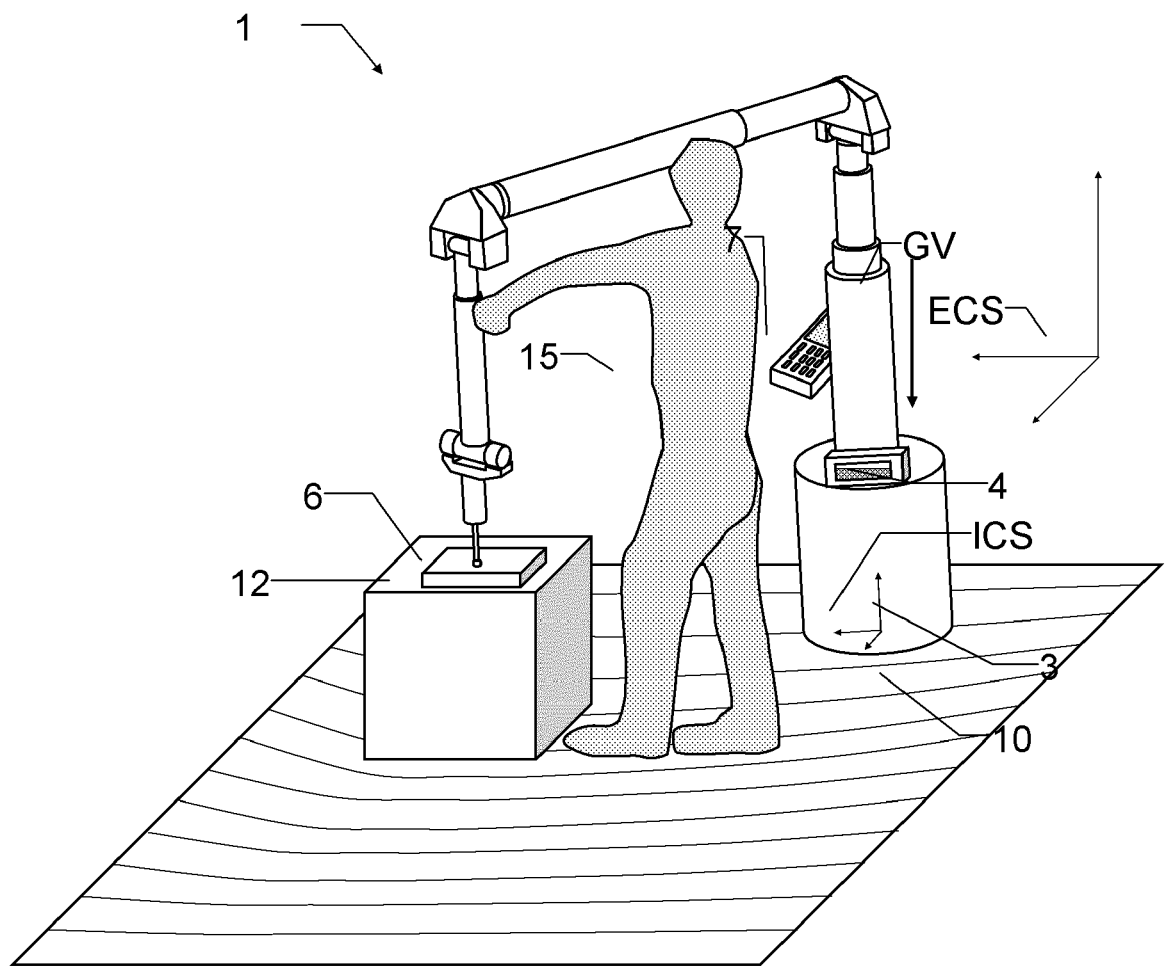
FIG. 2 shows a measurement scene with an articulated arm CMM according to the invention, the floor of the measurement room being tilted caused by a load of the user and the object to be measured.

FIG. 2 shows a measuring scenario wherein a surface of an object 12 is measured. Therefore, points of interest of the surface 12 are touched by the probe 6 of the articulated arm. In a measuring position of the probe 6, the actual setting of the articulated arm is determined by the sensing units which are coordinated with each of the arm-joints. The output of each sensing unit is transmitted to the computing unit 7, which calculates a position in the internal coordinate system ICS of the touched surface-point relative to the base 3.

The floor—as the supporting surface 10 for placing the base of the articulated arm—is bent by the load of the measuring object 12 and also by the steps of the operator 15. As a consequence thereof, the slope of the floor varies during measurements.

According to the invention, the variations of the slope of the floor are taken into consideration for deriving the external positions of the measured points. Therefore, an inclinometer 4 is mounted on the base of the articulated arm. The inclinometer 4 is formed, for example, as optoelectronic two-axial tilt sensor and provides a highly precisely measured tilt relative to the gravitational vector GV.

Hence, the measured slope values are used by the computing unit 7 for referencing the internal positions of the touched surface-points relative to the external coordinate system ECS of the measuring room.

The derived external measuring-positions may be displayed and/or stored by the computing unit 7. Additionally, the slope value—which is considered for the determination of the external position—may be displayed to a user, too.

Although the inclinometer 4 is shown as separate unit which is mounted onto the base 3 of the articulated arm, an embodiment of the inclinometer 4 being integrated into the base 3 may also be realized.

As the inclinometer 4 may measure the actual slope of the base in connection with each position measurement, the correct and actual slope is always considered for determining the external positions of the measuring points.

Thereby, FIG. 2 has to be understood as schematic in order to illustrate the concept of the invention.

The design of the articulated arm itself and the design of the joints are well known by a skilled person and not part of the invention. Thus, all kind of articulated arms known in the state of the art may be used together with the invention.

The probe 6 of the articulated arm CMM may also be designed in different known manners. For example, the probe may be designed as a ruby ball and formed for contacting a surface point to be measured. Alternatively, the probe 6 may be formed as optical sensor, for example for spot metering or for scanning of an object surface. Furthermore, exemplary shown in European Patent Application No. 07124101.2, the usage of a camera as the probe—thus being formed for recording pictures of a measuring object—is described. By means of the articulated arm CMM, a position and orientation of the camera—as the probe—can be determined high precisely.

Figure 3:
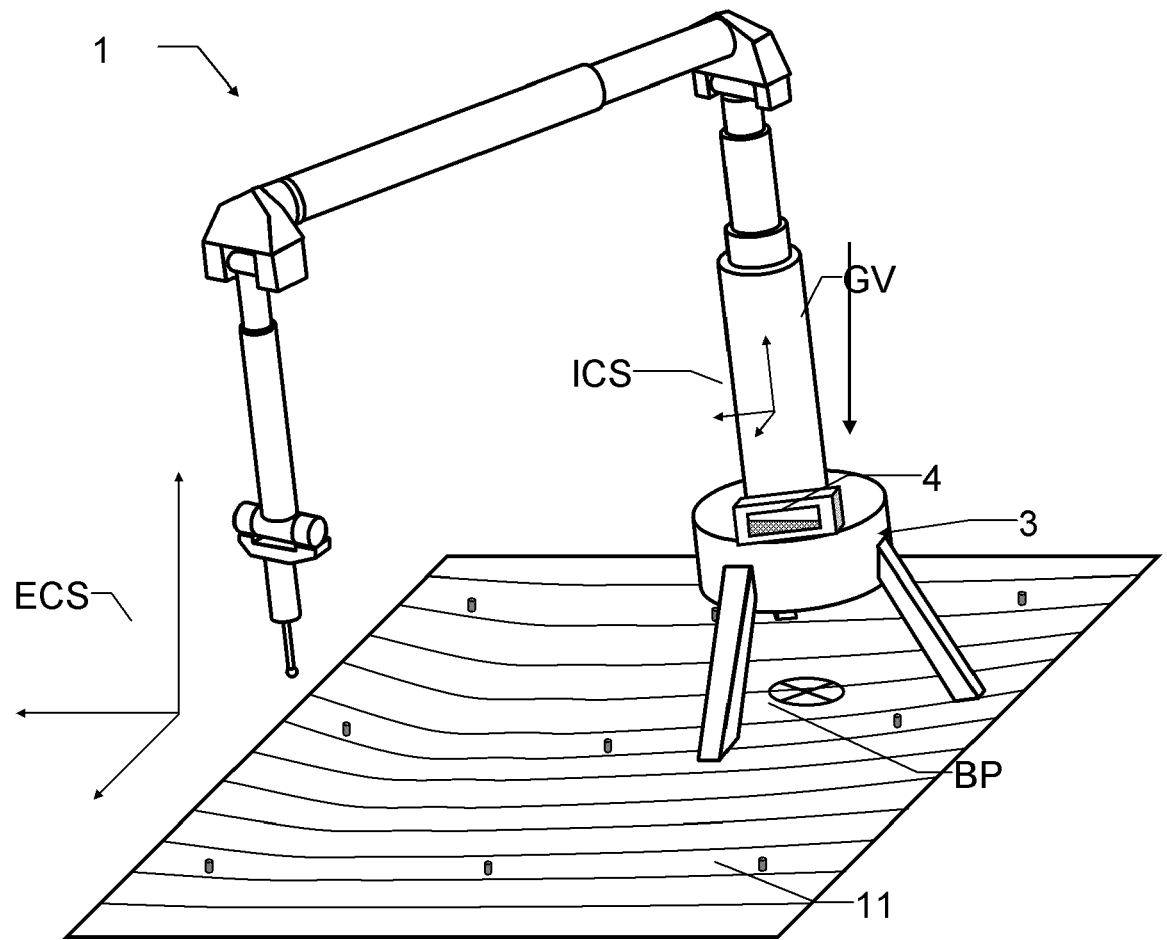
FIG. 3 shows another measurement scene with an articulated arm CMM according to the invention, the base comprising a stand for placing the CMM onto a supporting surface.

FIG. 3 shows a measuring scenario similar to FIG. 2. However, in FIG. 3 the base 3—as that part which is not moved during measurements—of the shown articulated arm CMM 1 comprises a floor stand. According to the invention, the base 3 further comprises an inclinometer 4 for measurement of a slope relative to the external gravitational vector GV—which is referenced in the external coordinate system ECS—and for providing an electronic slope value.

The shown floor is inclined relative to a horizontal plane. Therefore, also the base of the articulated arm is not oriented horizontally.

Furthermore, exemplary, the shown articulated arm CMM 1 comprises a counterbalance system that uses spring forces for providing a balanced arm. Because such a counterbalance system may introduce varying forces which—summed up—act not straight down onto the base 3 while operating and moving the probe of the arm, a torque and said forces onto the base may introduce a slope of the base in case the support or the base are not rigid enough.

By measuring the exact slope of the base relative to the gravitational vector GV or to a horizontal plane by the inclinometer 4, the slope is considered for calculating the external measuring position of a point measured with the probe and no error caused by a tilt of the floor or the base will be introduced.

Furthermore, FIG. 3 shows defined reference points 11 installed on the floor—in order to provide the possibility of determining the base-position BP after moving the CMM. The exact positions of the reference points 11 are known in the external coordinate system ECS. The reference points 11 are positioned in a grate-forming way so that at least three reference points 11 can be reached by the probe of the articulated arm CMM 1 wherever the base 3 of the CMM is positioned in the measurement room. Hence, by measuring at least three reference points 11 by the articulated arm CMM 1, the external position of the base BP can be recalculated and, thereafter, used for referencing the internal measuring-position relative to the external coordinate system ECS.

The floor stand of the base 3 shown herein may alternatively be designed as a trolley stand for easily moving the articulated arm CMM 1 to another place on the floor.

Alternatively to the method of measuring at least three reference points for determining the base-position, the articulated arm CMM 1 may also be moved to a predefined place on the floor. For example, receptacles for the base may be installed at known positions on the floor. Thus, the CMM 1 may be moved to the predefined and known places and fixed to a receptacle so that the external base-position BP is known with a high accuracy.

Figure 4:
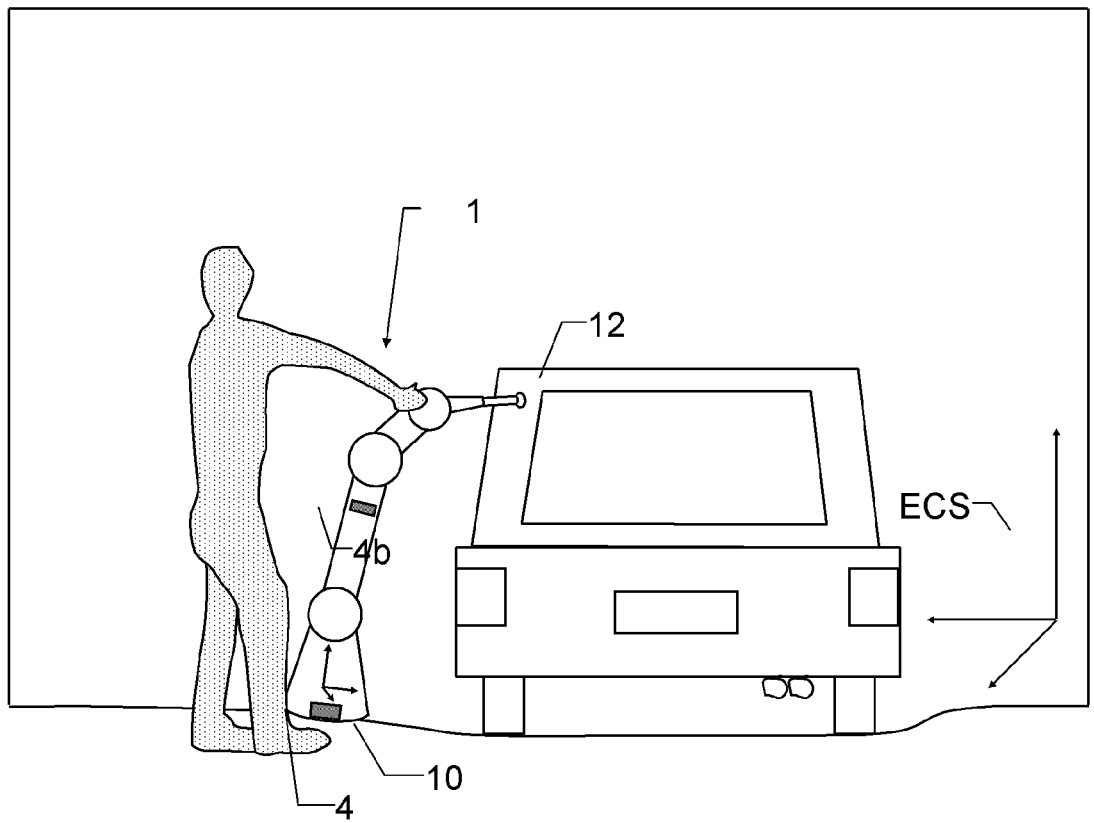
FIG. 4 shows another measurement scene with an articulated arm CMM according to the invention, the floor of the measurement room being tilted caused by the load of a car to be measured.

FIG. 4 shows another example to illustrate the principle of the invention. As the measured car 12 causes the floor to bend, the slope of the articulated arm CMM 1—being placed on the floor which serves as the supporting surface 10—varies.

According to the invention, not only a known external position of the base of the CMM 1 is used for deriving a relation between the CMM-internal and the external coordinate system ECS, but also a highly precisely measured slope of the base.

Therefore, a first and a second inclinometer 4, 4b are arranged on the articulated arm in order to measure the exact orientation of the base relative to a horizontal plane and, thus, relative to the external coordinate system ECS.

Thus, consideration of the slope and, therefore, a reduction or elimination of errors caused by the varying load conditions of the floor is provided according to the invention.

Figure 5:
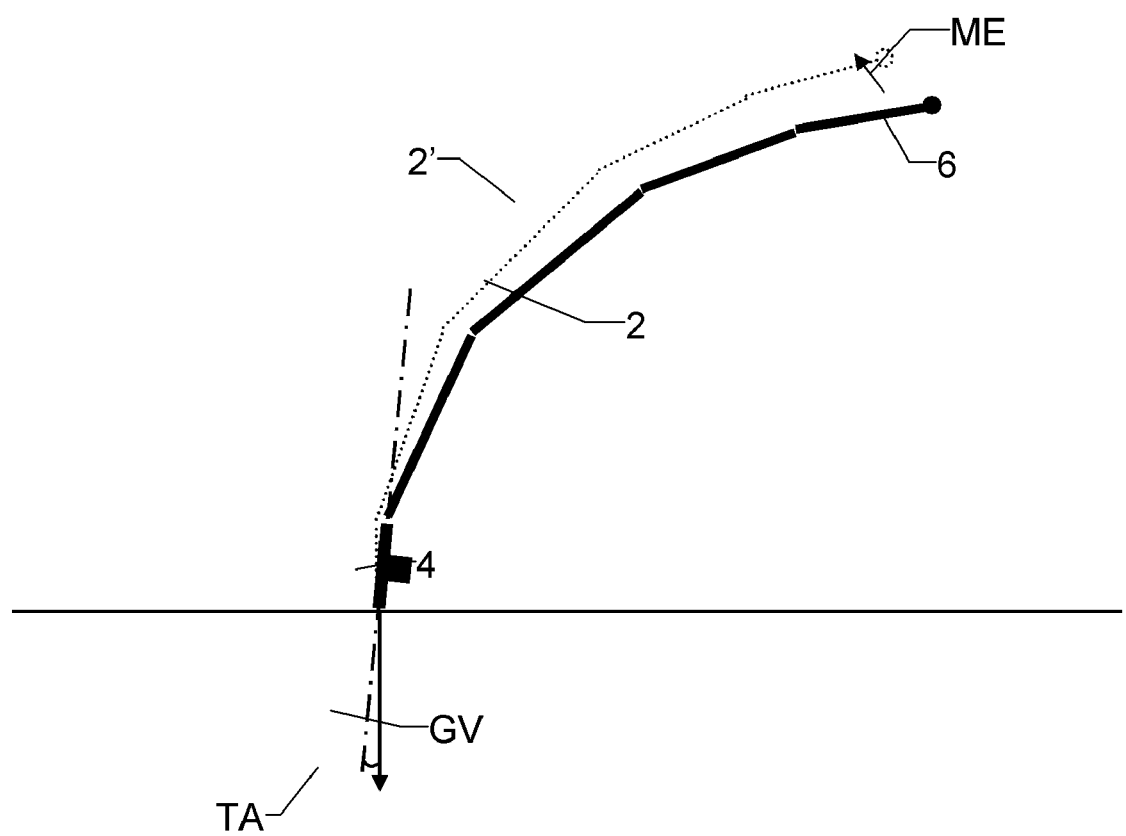
FIG. 5 shows a pure schematically two-dimensional view of an articulated arm CMM which illustrates a measuring error caused by a tilted base.

FIG. 5 illustrates a measuring error ME caused by a tilt of the base or of the supporting surface.

The articulated arm 2' shown with the broken lines is not tilted—which means that the base of this arm is oriented exactly horizontally. Contrary thereto, the articulated arm 2 shown with the continuous lines has a minimum tilt relative to a horizontal plane. By assuming that both arms are oriented horizontally and are using only a known base position for referencing measuring points relative to an external measuring area—according to the state of the art—the shown error ME $\Delta x + \Delta y$ would be introduced.

Thus, together with the step of referencing the measured internal positions by using an available external position of one defined point of the base, the assumption that the slope of the base does not vary during measurements has turned out to be a disadvantage as, in case of variations of the slope of the base after identifying the external position of the base, the measured internal positions are transferred into the external coordinate system imprecisely and/or erroneously.

Therefore, according to the invention, the tilt value of the base relative to the horizontal plane is measured, for example, as tilt angle TA relative to the gravitational vector GV. Thereby, the longitudinal axis of the tilted base is shown as dash-dot line to illustrate the tilting angle TA.

As described above, the measured tilt by the inclinometer 4 is considered for the determination of the measuring position of the probe in the external measuring area. Thus, the error introduced by the slope of the base is compensated dependent on the highly precisely measured slope angle.

Although the invention has been illustrated above, partly with reference to some preferred embodiments, it must be understood that numerous modifications and combinations of different features of the embodiments can be made. All of these modifications lie within the scope of the appended claims.

I claim:

1. A coordinate measuring machine for determining a measuring position of a probe, comprising:
    an articulated arm having first and second ends and at least one joint between the first and the second ends, the first end forming a base being positionable on a supporting surface, the second end being movable relative to the first end and having attached the probe;
    at least one sensing unit for measurement of an actual relative setting of said at least one joint; and
    at least one computing unit for calculating a measuring position of the probe relative to the base; and for referencing the measuring position in an external coordinate system by using a provided base-position in the external coordinate system, wherein:
        the articulated arm includes a first inclinometer for measurement of a slope relative to an external vector referenced in the external coordinate system relative to the gravitational vector and for providing an electronic slope value; and
        the slope value is further used for referencing the measuring position in the external coordinate system.

2. The coordinate measuring machine according to claim 1, wherein said first inclinometer is arranged on the base of said articulated arm.

3. The coordinate measuring machine according to claim 1, wherein at least a second inclinometer is arranged on the articulated arm.

4. The coordinate measuring machine according to claim 1, wherein at least a second inclinometer is arranged on the base.

5. The coordinate measuring machine according to claim 1, wherein said first inclinometer is formed as a two-axis inclinometer.

6. The coordinate measuring machine according to claim 1, wherein in connection with each position measurement the actual slope value is provided by said first inclinometer and used by said at least one computing unit for referencing the measuring position in the external coordinate system.

7. The coordinate measuring machine according to claim 1, wherein the actual slope value is provided continuously.

8. The coordinate measuring machine according to claim 1, wherein the actual slope value is provided continuously, with a given measurement rate, by said first inclinometer.

9. The coordinate measuring machine according to claim 1, wherein the articulated arm includes at least five joints and at least five sensing units being assigned respectively to each of said at least five joints.

10. A method for determining a measuring position of a probe of a coordinate measuring machine, the coordinate measuring machine including an articulated arm having first and second ends and at least one joint between the first and the second end, the first end forming a base being positionable on a supporting surface, the second end being movable relative to the first end and having attached the probe, the method comprising the steps of:
    measuring an actual relative setting of said at least one joint;
    calculating a measuring position of the probe relative to the base;
    referencing the measuring position in an external coordinate system by using a provided base-position in the external coordinate system;
    measuring a slope of at least one part of the articulated arm relative to an external vector referenced in the external coordinate system relative to the gravitational vector and providing a slope value; and
    further using the slope value for referencing the measuring position.

11. The method according to claim 10, wherein the slope of the base respectively of the supporting surface is measured.

12. The method according to claim 10, wherein the slope is measured relatively to a horizontal plane.

13. The method according to claim 10, wherein the slope is measured continuously.

14. The method according to claim 10, wherein the slope is measured continuously with a given measurement rate.

15. The method according to claim 10, wherein in connection with each position measurement the actual slope value is provided and used for referencing the measuring position.

16. The method according to claim 10, wherein the base-position is provided by:
    measuring positions of at least three reference points relative to the base using the articulated arm of the coordinate measuring machine, the positions of the reference points being known in the external coordinate system; and thereby referencing the base-position in the external coordinate system.

* * * * *